(12) United States Patent
Sartorio

(10) Patent No.: US 7,886,629 B2
(45) Date of Patent: Feb. 15, 2011

(54) MACHINE TOOL AND MANIPULATOR DEVICE ADAPTED TO BE MOUNTED ON SUCH MACHINE

(76) Inventor: Franco Sartorio, Corso Montevecchoi, 48, I-10129 Torino (IT)

( * ) Notice: Subject to any disclaimer, the term of this patent is extended or adjusted under 35 U.S.C. 154(b) by 1607 days.

(21) Appl. No.: 10/332,262

(22) PCT Filed: Jun. 23, 2001

(86) PCT No.: PCT/EP01/07045

§ 371 (c)(1),
(2), (4) Date: Feb. 11, 2003

(87) PCT Pub. No.: WO02/02281

PCT Pub. Date: Jan. 10, 2002

(65) Prior Publication Data

US 2004/0025761 A1    Feb. 12, 2004

(30) Foreign Application Priority Data

Jun. 30, 2000    (IT) .......................... T02000A0657

(51) Int. Cl.
G05G 11/00    (2006.01)
B23Q 1/62    (2006.01)
(52) U.S. Cl. ....................... 74/490.09; 33/1 M; 108/20; 108/102
(58) Field of Classification Search ............... 74/490.07, 74/490.09, 490.08, 490.1, 480 R; 108/20, 108/102, 137; 33/1 M; 248/425, 656, 657; 269/59, 71, 73; 414/749.1; 901/16
See application file for complete search history.

(56) References Cited

U.S. PATENT DOCUMENTS

| | | | | |
|---|---|---|---|---|
| 3,638,933 A | * | 2/1972 | Burnette et al. ............... | 269/60 |
| 4,409,860 A | * | 10/1983 | Moriyama et al. ....... | 74/490.09 |
| 4,628,756 A | * | 12/1986 | Kimura et al. ........... | 74/490.09 |
| 5,309,847 A | * | 5/1994 | Matsumoto .................. | 108/143 |
| 5,311,791 A | * | 5/1994 | Yanagisawa .............. | 74/490.09 |
| 5,390,128 A | | 2/1995 | Ryan et al. ............. | 364/474.35 |
| 5,613,403 A | * | 3/1997 | Takei ...................... | 74/490.09 |
| 5,656,905 A | | 8/1997 | Tsai ....................... | 318/568.21 |

(Continued)

FOREIGN PATENT DOCUMENTS

EP    0 448 107 A1    3/1991

(Continued)

*Primary Examiner*—Thomas R Hannon
*Assistant Examiner*—Phillip A Johnson
(74) *Attorney, Agent, or Firm*—Hayes Soloway P.C.

(57) ABSTRACT

A machine tool comprises a first travelling assembly (10) which carries in its turn a second travelling assembly (22). The first assembly (10) is adapted to position the second assembly (22) in a relatively wide space ($S_1$) and with movements at relatively low speeds and accelerations. The second assembly (22) carries in its turn a tool which is provided with actuators for positioning the tool in a relatively narrow space ($S_2$) and with movements at relatively high speeds and accelerations. The machine includes means for controlling the movements of the two assemblies (10, 22) which are so arranged to obtain s global movement of the tool without solutions of continuity in all the space of movement (S1) of the first assembly (10). The invention also relates to a manipulator device which can be used independently or be installed as a second assembly (22) on a travelling structure of a machine tool.

2 Claims, 9 Drawing Sheets

U.S. PATENT DOCUMENTS

| | | | | |
|---|---|---|---|---|
| 5,724,893 A | * | 3/1998 | Lee et al. | 108/20 |
| 5,971,254 A | * | 10/1999 | Naud et al. | 228/180.5 |
| 6,134,981 A | * | 10/2000 | Novak et al. | 74/490.09 |
| 6,327,929 B1 | * | 12/2001 | Yanagisawa | 74/490.09 |
| 6,363,809 B1 | * | 4/2002 | Novak et al. | 74/490.09 |

FOREIGN PATENT DOCUMENTS

| WO | WO 96/29634 | 3/1996 |
|---|---|---|

* cited by examiner

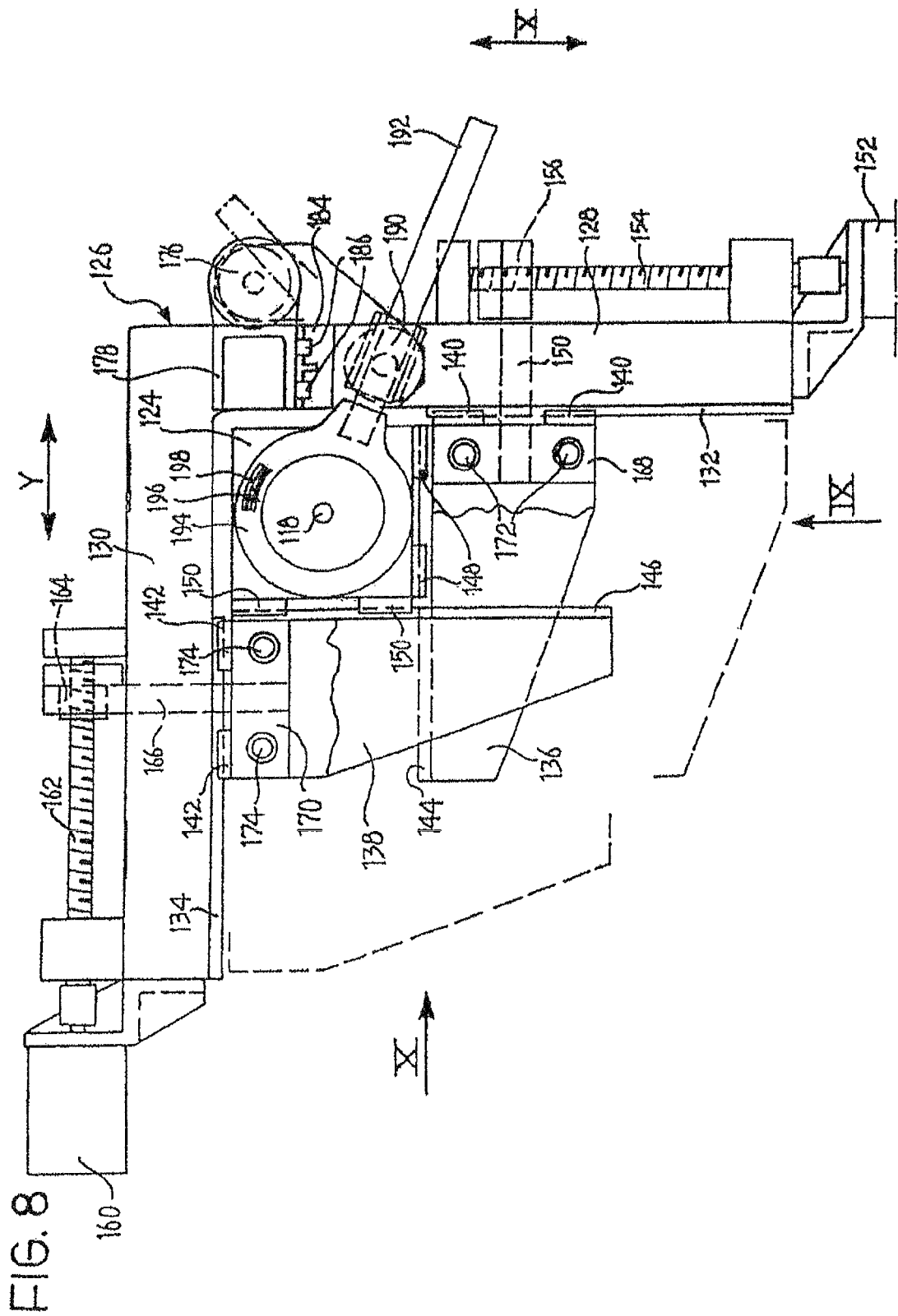

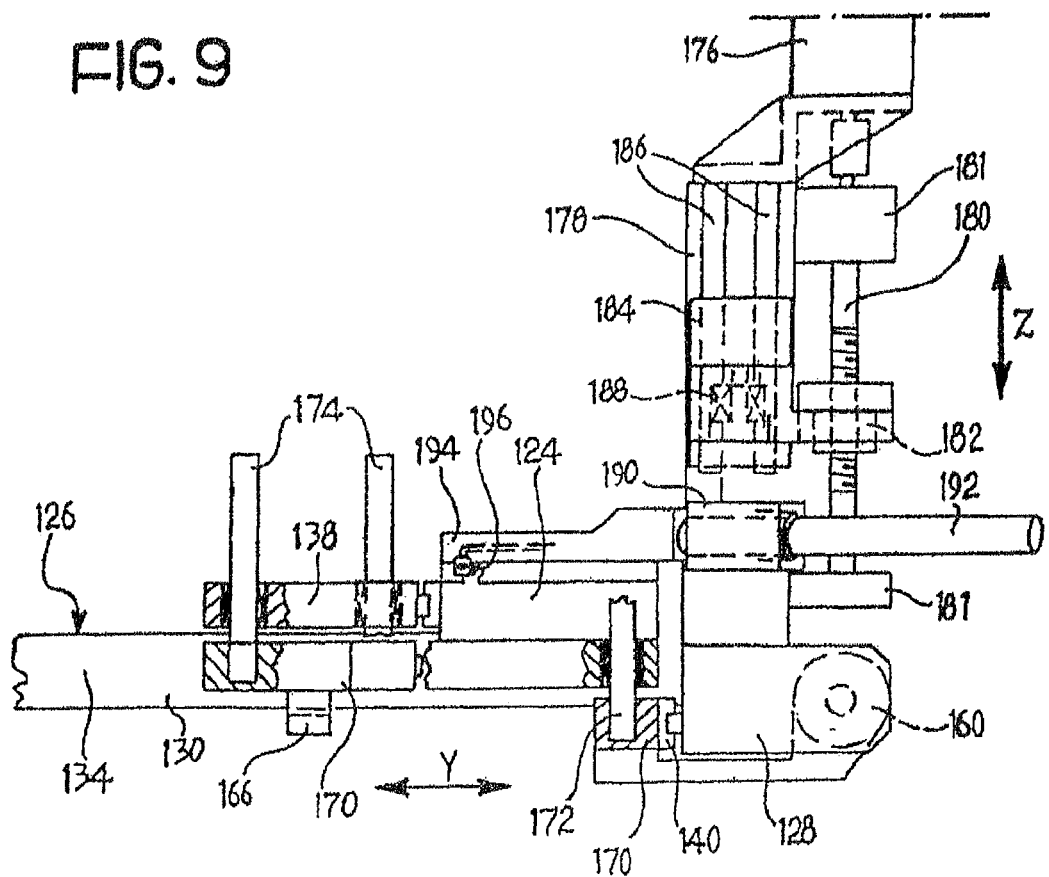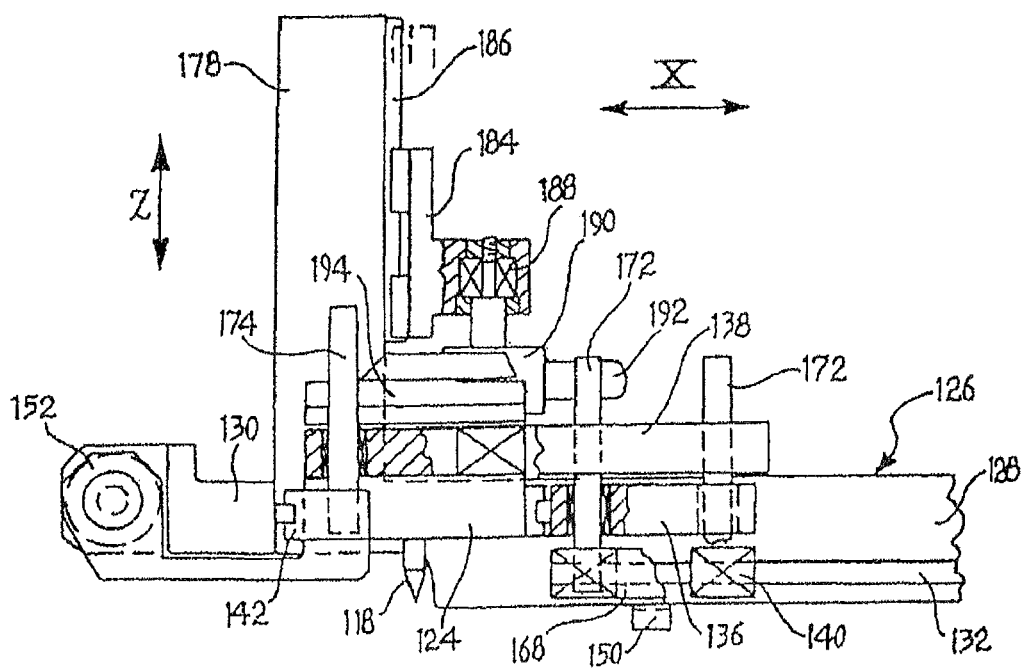

MACHINE TOOL AND MANIPULATOR DEVICE ADAPTED TO BE MOUNTED ON SUCH MACHINE

The present invention relates in the first place to a machine tool according to the preamble of claim 1.

A machine tool according to the preamble of claim 1 may be any type of numerically controlled machine, such as for example a plotter, a laser machine for the cutting of sheet metal, a milling machine for carrying out three-dimensional surface finishing operations.

FIG. 1 is an end elevational view and FIG. 2 is a plan view of a machine tool operating according to Cartesian coordinates of a generally known type, which has a manipulator device according to the invention associated thereto, as will be described below.

A known machine of the type considered generally has a travelling assembly 10, which in the following will be conventionally called "first assembly" or "heavy assembly", and which comprises a carriage 12 adapted to move in a linear direction X along a fixed frame constituted by slideways 14.

The carriage 12 supports in its turn a slide 16 which is adapted to move in an orthogonal linear direction Y.

In the known machines a tool 18, which in the above-mentioned examples may be a drawing pen, a laser source or a milling cutter, is directly supported by the slide.

In some known machines the tool 18 may also be connected to the slide 16 in such a manner that it can be moved in a linear direction Z orthogonal to the said two linear directions X and Y.

In FIGS. 1 and 2 a worktable, indicated 20, is interposed between the slideways 14 and is adapted to support a workpiece, such as a metal sheet, to be machined by means of the tool 18.

Among the known machine tools to which the invention is applicable are also those which have a polar structure or are variously articulated, as in the case of a conventional robot.

In all the cases, the travelling members, such as the carriage 12 and the slide 16 of the travelling assembly 10 of FIGS. 1 and 2, will be equipped with respective numerically controlled actuators, not shown.

It is understood that the above-mentioned directions of movement X and Y are not necessarily horizontal and that the above-mentioned direction Z is not necessarily vertical.

In order to discuss the problem of the invention the case will be considered, by way of non-limiting example, of a laser cutting machine which hags to cut a relatively large sheet metal workpiece whose perimeter has a relatively complex shape, such as that of FIG. 3, with concave perimeter segments and convex perimeter segments inbetween, having even very narrow radii of curvature.

The cutting path should have to be followed ideally at a constant tangential speed equal to the maximum machining speed allowed by the power of the laser, by the type and the thickness of the material, and by other well known factors related to this cutting technology.

In practice the cutting speed along the curved segments of the cutting path will have to be slowed down correspondingly to the radius of curvature of the segments. In these curved segments, the actuators of the axes of movement of the machine, such as X and Y are in fact required to impart to the cutting head, that is to the tool 18, instantaneous cutting accelerations equal to $A=v^2/r$, where v is the instantaneous tangential speed and r is the radius of curvature.

In the specific example shown by way of example in FIGS. 1 and 2, it is to be considered that especially the carriage 12, but also the slide 16, are rather heavy elements to which only limited speeds and accelerations can be imparted.

Therefore, the speed and the accuracy with which the cutting operation can be carried out are limited by the strong inertias of the carriage 12 and of the slide 16.

A first object of the invention is to provide a machine tool which, although including heavy elements, such as the carriage 12 and the slide 16, in order to accomplish large movements, is able to quickly perform, in the whole area or volume of the machine, precision operations, such as plotting, cutting, drilling or shaping operations, even on workpieces of large dimensions.

According to the invention this object is attained by means of a machine tool as claimed.

According to the invention the first assembly 10 carries in its turn a second assembly, indicated 22 in FIGS. 1 and 2, four preferred embodiments of which will be described below.

In the exemplary case of FIGS. 1 and 2, the second assembly 22, which includes a tool, is fixed to the slide 16 of the first assembly 10 and a moves with it in the direction conventionally indicated Y, as well as with the carriage 1, in the direction conventionally indicated X.

The second assembly 22 will also be called below "light assembly".

The invention is based on the remark that only a light assembly and therefore with limited strokes can develop very high dynamic performances. In order to extend the benefits of these performances to spaces much wider than those of the light assembly it is necessary for it to be continuously displaced along the cutting path (or other working path) by a conventional heavy assembly having two or three axes, such as that a indicated 10 in FIGS. 1 and 2.

In order to obtain this it is not sufficient to move the light assembly 22 from point to point in the wider space, indicated $S_1$ in FIG. 2, in which the heavy assembly 10 can operate, by alternating the working movements of the light assembly 22 in its narrow space $S_2$ with those of the conventional heavy assembly 10.

It is instead necessary to coordinate, with a suitable software, all the axes involved in order to guarantee the continuity of the movement.

In order to obtain this, the dynamic characteristics of the two assemblies 10 and 22 are correlated with each other.

By way of example the correlations will be described which shall exist in the case of two assemblies, the light one 22 and the heavy one 10, the latter being larger and having therefore higher inertias, such assemblies operating only in one plane, such as the plane X, Y.

In FIG. 2 it is assumed that the space of movement of the light assembly, indicated $S_2$, is a square with half-sides of a length d.

At rest, the tool 18 is at point A, in the centre of the square $S_2$.

The law of motion of the, two assemblies, the heavy one 10 and the light one 22, will now be discussed making reference to the diagrams of FIGS. 4 and 5.

The diagrams of FIGS. 4 and 5, respectively, indicate how the speeds v vary with time and how the displacements of the two assemblies vary with time in their spaces $S_1$ and $S_2$.

Since the half-side d is equal to the minimum distance between the centre A and the periphery of the narrow space $S_2$, the most critical case is that of the movement of the light assembly 22 from A to B, considering that the tool 18, and therefore the assembly 22, will then have to go on further, in the space $S_1$, in order to perform a rectilinear cut beyond the point B in the direction A-B.

The movements of the two assemblies 10 and 22 start at the same time. The light assembly 22 starts with the highest possible acceleration (line $v_2$, FIG. 4) in order to reach as soon as possible the maximum cutting speed $v_r$, which is reached at time $t_1$, after which it goes on maintaining its speed constant.

The carriage 16, which displaces the narrow space $S_2$, begins to move with an acceleration which is substantially lower than the previous one and is consistent with the characteristics of the first assembly 10.

It is however of fundamental importance that the maximum speed the first assembly 10 can reach be substantially higher than the maximum cutting speed $v_r$. In this manner the speed of movement $v_2$ of the heavy assembly 10 will reach, at the time $t_2$, the cutting speed of the tool 18 and will exceed it, recovering the previously accrued delay to bring back the position of the tool 18 to the centre of the narrow space $S_2$.

For having a continuity of the movement it is necessary that the centre of the narrow space $S_2$ succeeds in reaching the tool 18 at time $t_3$ and in overtaking the tool 18 before the latter reaches the distance d, that is the limit of the narrow space $S_2$.

If this did not happen, the movement of the tool 18 would have to be stopped with respect to the narrow space $S_2$ and then the tool should continue its path at the speed of movement of the first assembly 10. This fact, should at least two axes such as X and Y be involved at the same time, would create an unacceptable discontinuity in the movement of the tool.

Starting from these considerations it is possible to obtain the equations which put into relationship with each other the various quantities involved, equations in which the maximum working speed of the tool and the maximum speed and acceleration of the second assembly 22 will be prevailingly allotted, while the unknowns will be constituted by the dimensions of the narrow space $S_2$ and by the maximum acceleration of the second assembly 22.

Another object of the invention is to provide a manipulator device for the tool that is particularly effective, can be used independently on relatively small workpieces and can be mounted as well as a second assembly on a machine tool as claimed, in order to operate on relatively large workpieces.

Manipulator devices are known in various forms and an example of them is disclosed by the document U.S. Pat. No. 5,656,905. The devices, in question are the so-called "concurrent axes devices" or "space robots" or "PKMs" ("Parallel Kinematic Machines").

In the majority of these known devices, the means which control the movements and support the platform comprise numerically controlled actuators which are connected to the platform by linkages adapted to vary the distance between the ends of the linkages.

These known devices generally offer the economic advantage to allow the use of actuators and linkages for the connection to the platform which are all identical to each other, as well as that of allowing the installation of both the actuators and the position transducers elsewhere than on the travelling platform, and in particular on a fixed part (base) of the device, or at least on parts having a fixed point, such as for example the members which connect the fixed part to the travelling platform, with obvious simplifications of the electrical wirings and reductions of the masses in motion.

The known PKM devices have however the drawback to be remarkably bulky in comparison with the space of movement of the travelling platform, because of the shapes of the said linkages, as well as the drawback of requiring a complicated algorithm for controlling the movements of the platform, which in its turn requires a complex software. In fact, in the known devices the space of evolution of the travelling platform turns out to be of a complex shape, so that it cannot be fully exploited both for practical (topological) reasons and for the fact that substantial portions of this space can be reached only by passing through singular points of the linkage, which are insurmountable.

The other object of the present invention is precisely to provide a manipulator device of the concurrent axes type, which on the one hand is much less bulky than the known devices and allows to fully exploit the available space of movement without having singular points, and which, on the other hand, requires a very simple software for controlling the movements of the platform.

According to the invention this object is attained by means of a manipulator device as claimed.

Thanks to the idea of solution as claimed, which is of the concurrent axes type, the movements imparted to the platform are linear and directed only according to Cartesian axes. These movements are obtainable from actuators preferably constituted by numerically controlled electric motors which, as in the known PKMs, can be advantageously installed on the fixed structure constituted by the frame of the device.

Moreover, if the axes are horizontal or have the same inclination, the actuators can be all identical.

In the case of two horizontal axes and a vertical axis, the actuators of the horizontal axes can be identical to each other, while the third actuator may differ only for the power developed and/or the presence of counterweights.

The actuators, thanks to the fact that they produce linear movements, can be controlled by a software much simpler than those of the known prior art, because of the simplicity of the algorithm which can be used, because it has only to manage Cartesian coordinates.

Moreover, thanks to the fact that the movements are only linear, a manipulator device according to the invention can be contained in a volume which is much more reduced with respect to the volume which is required by the linkages of the known PKM technique, for the same volume of the space available for the movements of the platform, such space being likely to be fully exploited thanks to the absence of singular points.

A device according to the invention can be advantageously applied as a travelling second assembly of high dynamics on a travelling member of a machine tool with Cartesian or polar coordinates, or variously articulated as in a robot.

The invention will become more clear from the reading of the detailed description which follows, reference being made to FIGS. 6 to 10 of the attached drawings, in which:

FIGS. 1 to 5 have already been described;

FIG. 6 is schematic plan view of a first embodiment of a manipulator device with two Cartesian axes, which can be used independently or can be installed as a second assembly 22 on the travelling structure or first assembly 10 of FIGS. 1 and 2;

FIG. 7 is an elevational view of the same assembly according to the arrow VII of FIG. 6;

FIG. 8 is a schematic plan view, partially broken away, of a manipulator device with three Cartesian axes, which can be used independently as well or can be installed as a second assembly 22 on a travelling structure or first assembly 10 of a machine tool like that of FIGS. 1 and 2;

FIG. 9 is a schematic elevational view, partially broken away, according to the arrow IX of FIG. 8;

FIG. 10 is another schematic elevational view, partially broken away, according to the arrow X of FIG. 8;

Figure 1:
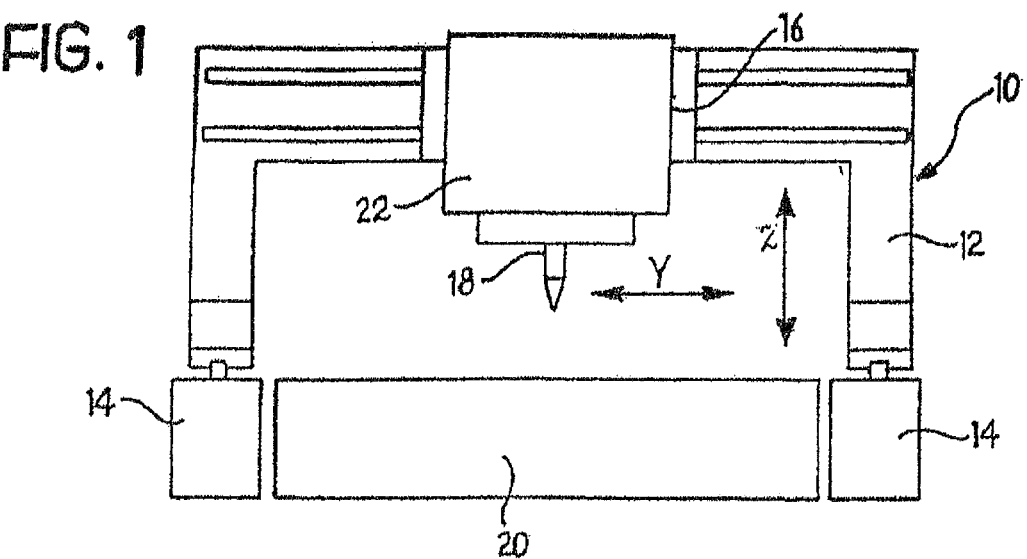
Figure 2:
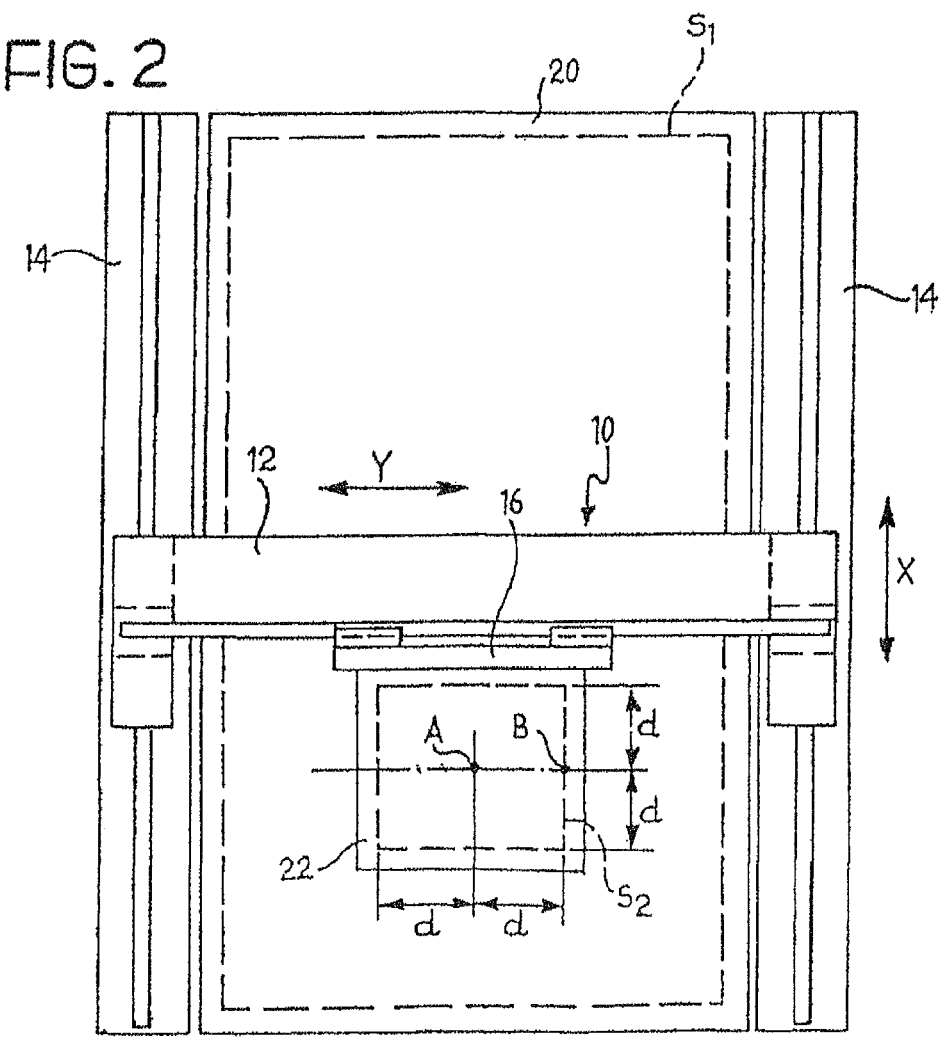
Figure 3:
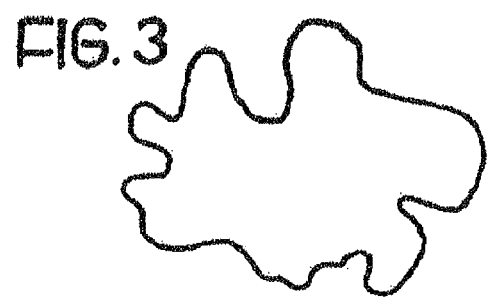
Figure 4:
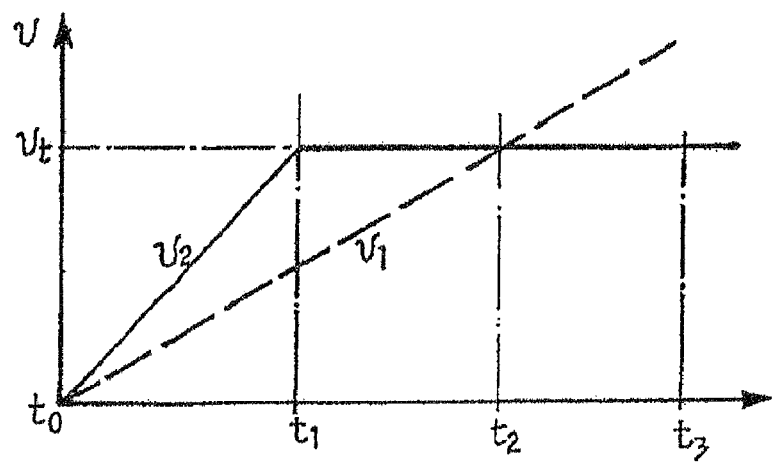
Figure 5:
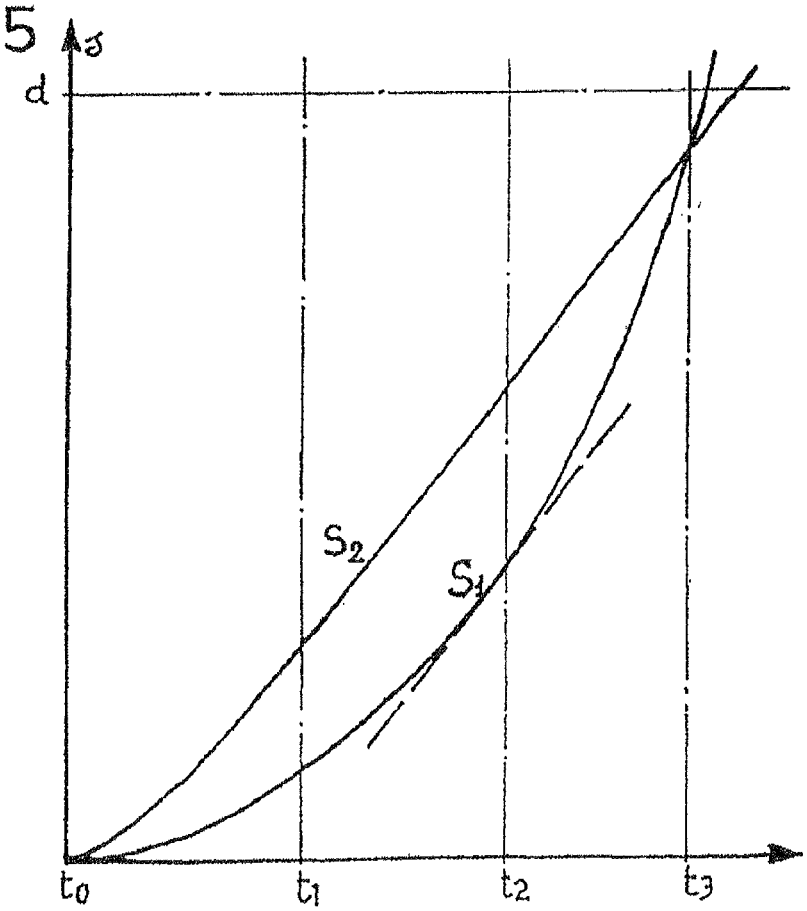
Figure 6:
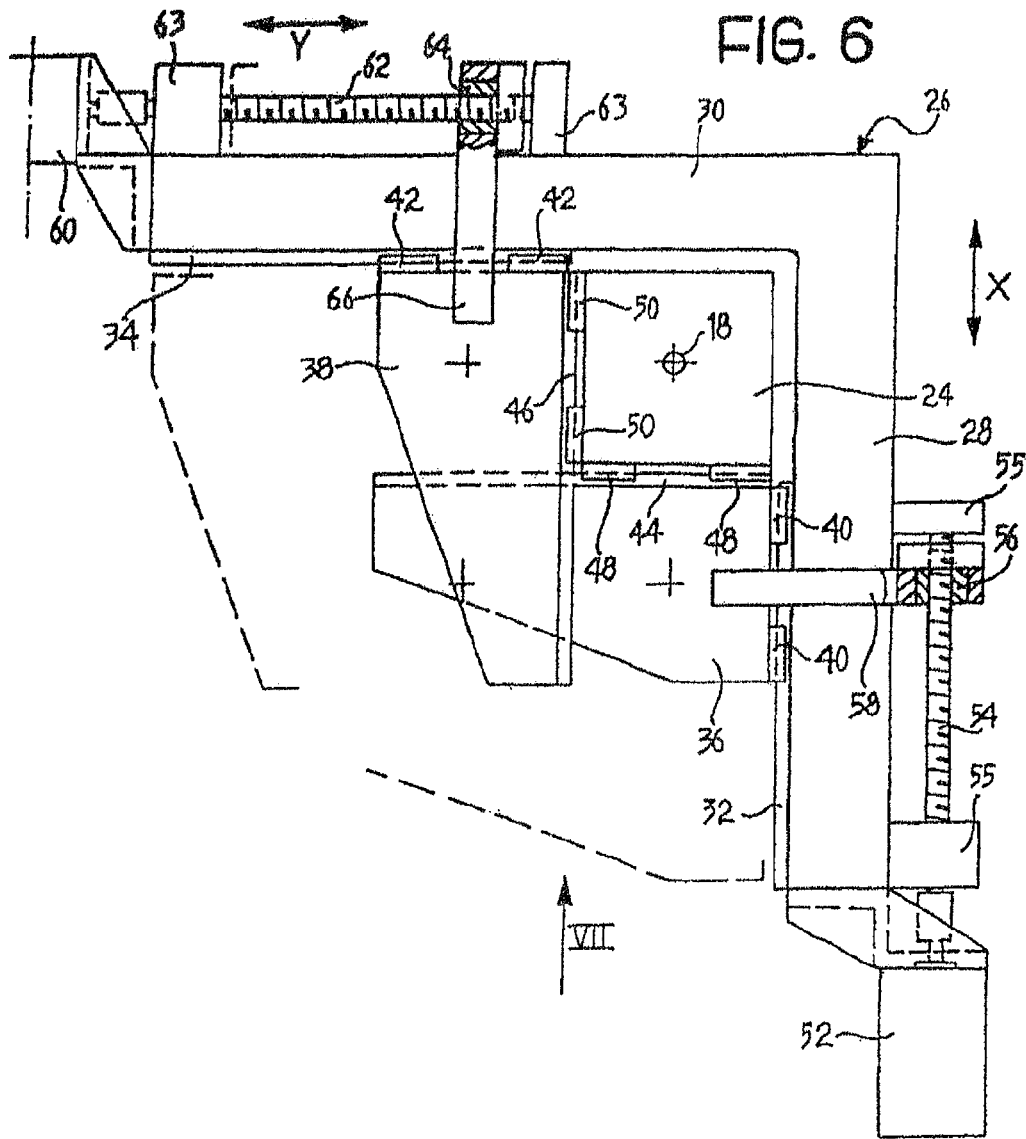
Figure 11:
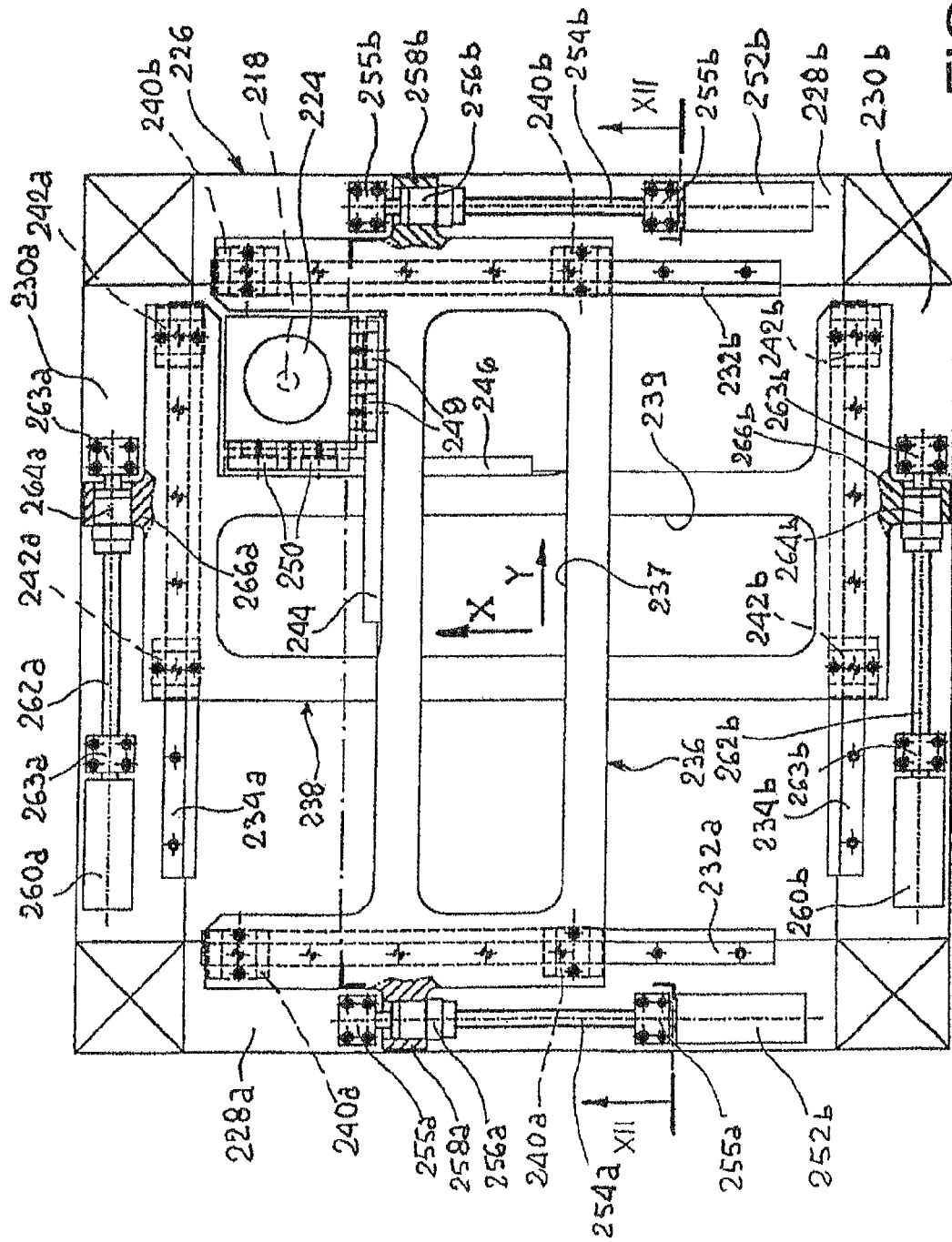
Figure 12:
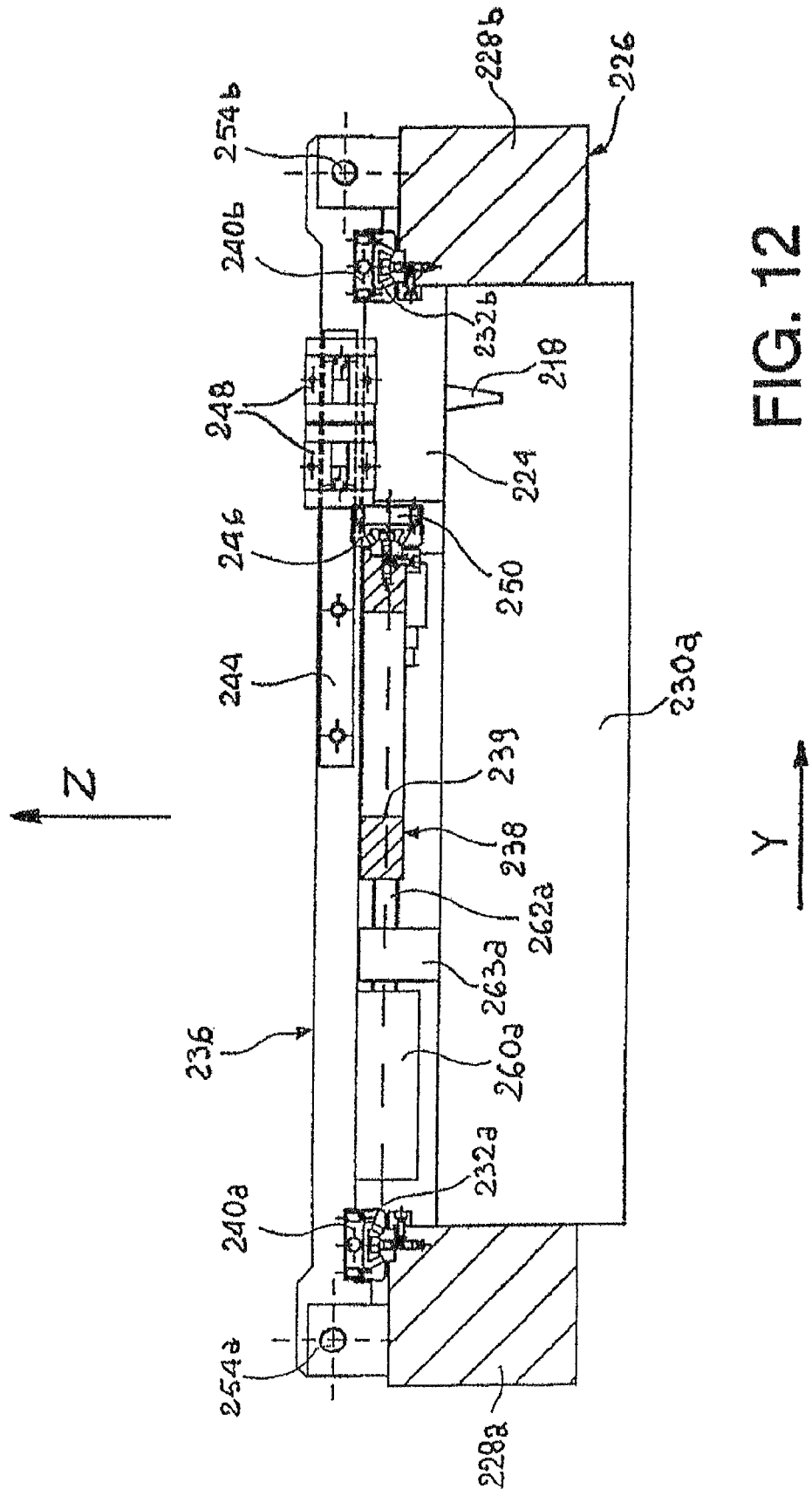
Figure 13:
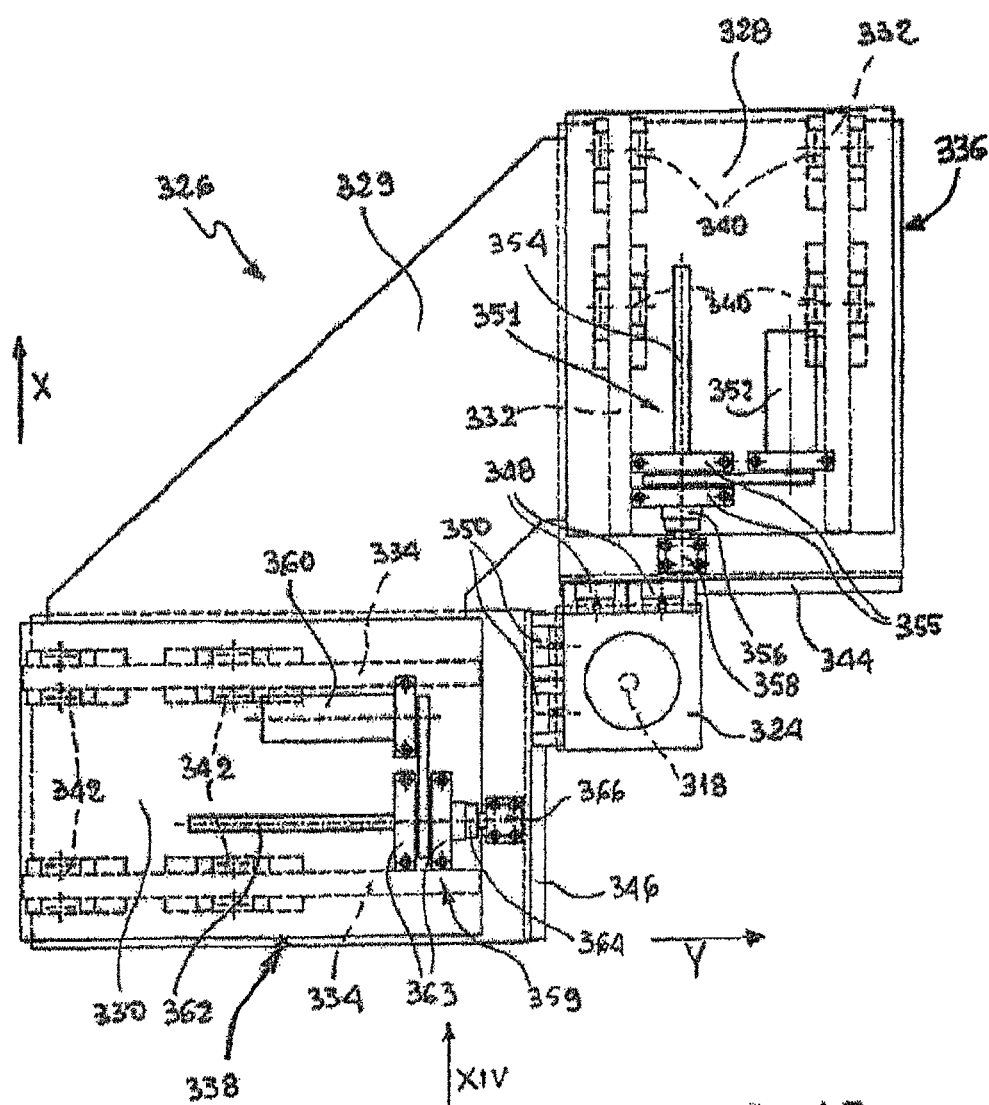
Figure 14:
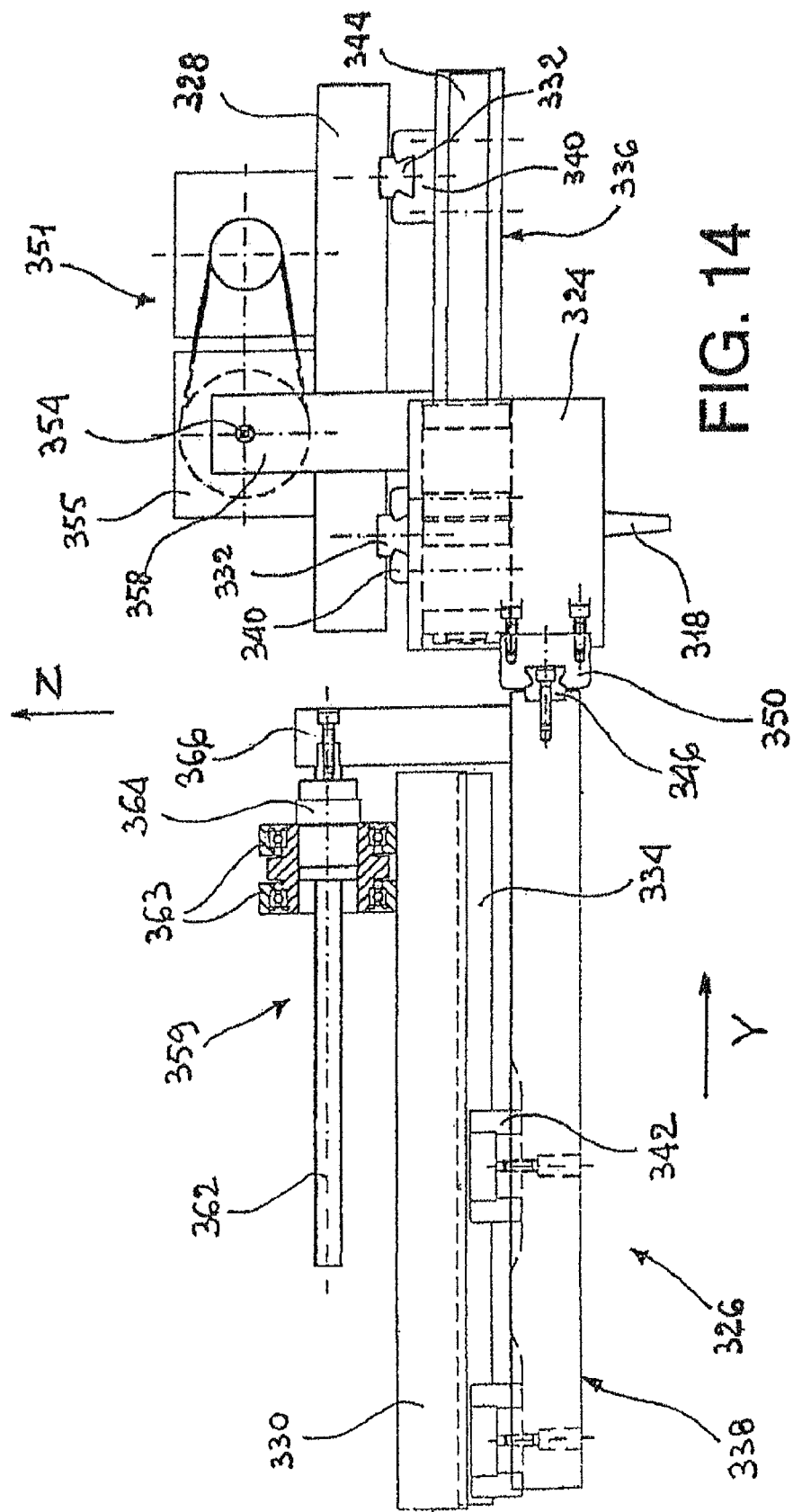

FIG. 11 is a schematic plan view, partially broken away, of a second embodiment of a manipulator device with two Cartesian axes, which can be used independently or can be installed as a second assembly 22 instead of the first embodiment of FIGS. 6 an 7 on the travelling structure or first assembly 10 of FIGS. 1 and 2;

FIG. 12 is a hybrid cross section of the second embodiment, taken along the broken line XII of FIG. 11;

FIG. 13 is schematic plan view of a third embodiment of a manipulator device with two Cartesian axes, which can be used independently or can be installed as a second assembly 22, instead of the first embodiment of FIGS. 6 an 7 or the second embodiment of FIGS. 11 and 12, on the travelling structure or first assembly 10 of FIGS. 1 and 2; and FIG. 14 is an elevational view of the third embodiment according to the arrow XIV of FIG. 13.

Figure 7:
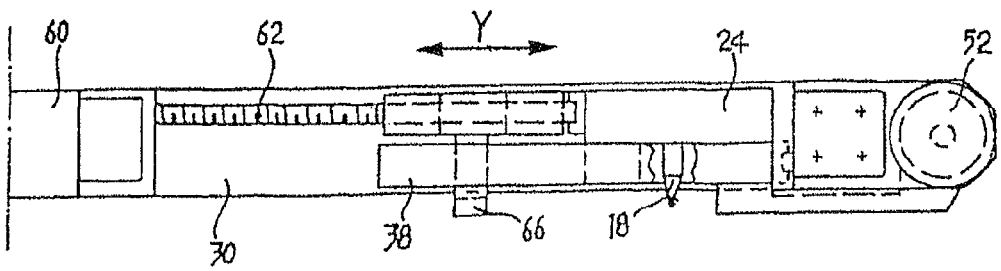

In FIGS. 6 and 7 the two directions corresponding to the Cartesian axes have been conventionally indicated X and Y, it being understood that these directions are not necessarily horizontal.

In FIG. 7 the tool, which may be a laser source, has been still indicated 18 and the same reference numeral 18 indicates its trace in FIG. 6.

The tool 18 is carried by a support platform constituted by a block 24 having a square shape in plan view.

The platform 24 is supported by a frame generally indicated 26.

The frame 26 is constituted by a rigid member having two branches 28, 30 extending according to two orthogonal directions X, Y in a working plan which is parallel to these directions.

Each branch 28, 30 is equipped with a respective slideway 32, 34.

For the reasons which will become clear below, the slideways 32, 34 are staggered in the direction Z perpendicular to the sliding plan.

Each slideway 32, 34 has a respective structure 36, 38 associated thereto, which is adapted to travel in the manner of a slide.

The two sliding structures 36, 38 are constituted by respective beams which are staggered like the slideways 32, 34 in order not to interfere with each other in their movements. This is the reason for which the guides 32, 34 are staggered.

In the embodiment shown in FIG. 6 the two beams 36 and 38 extend in cantilever fashion from the respective branches 28, 30.

Each sliding structure or beam 36, 38 is equipped with sliding shoes 40, 42, respectively, which are coupled with the respective slideways 32, 34.

In its turn, each of the sliding structures or beams 36, 38 is equipped with a slideway 44, 46, respectively, on a side thereof which faces the branch 30, 28, respectively, of the frame 26 to which the other sliding structure or beam is associated.

In its turn, the platform 24 is provided, on two sides orthogonal to each other, with sliding shoes 48, 50 which are coupled with the respective slideways 44, 46.

The configuration of all the slideways 32, 34, 44, 46, on the one hand, and of all the shoes 40, 42, 44, 46, on the other hand is such as to provide a form fit between the slideways and the shoes so that the platform 24 is supported, in addition to be guided, by the frame 26.

The movements in the direction X of the beam 36 and, consequently, of the platform 24 are imparted by a numerically controlled actuator which, in the example shown, is constituted by an electric motor 52.

The motor 52 drives a lead screw 54 which is rotatably mounted on two fixed supports 55 and drives in the direction X a nut screw 56 which has a bracket 58 fixed thereto, the bracket being fixed in its turn to the sliding structure or beam 36.

The movements in the direction Y of the other sliding structure or beam 38 and, consequently, of the platform 24 are produced by a numerically controlled actuator which, in the case shown, is also an electric motor 60, identical to the motor 52 and which, through a lead screw 62 which is rotatably mounted on two fixed supports 63, drives in the direction Y a nut screw 64 which has a bracket 66 fixed thereto; the bracket being fixed in its turn to the sliding structure or beam 38.

In FIGS. 8 to 10 the tool, which in this case may be a cutter for shaping a three-dimensional workpiece, is indicated 118 and its platform is indicated 124.

The two directions of the platform 124 in the working plane are still indicated X and Y, while the third direction, orthogonal to the preceding ones, is indicated Z.

In the embodiment of FIGS. 8 to 10 the platform 124 is also adapted to move in the direction Z perpendicular to the plane of movement parallel to the directions X and Y, while the motor 176, which is the actuator for the movement according to Z, is still kept on a fixed part, it being secured to the frame 126, as was already done with the actuators for the movements according to X and Y.

In order to obtain this feature the two sliding structures or beams 136 and 138 which move the platform 124 have been doubled by adding to each of them a respective carriage 168, 170 which has sliding shoes 140, 142 coupled to a respective branch 128, 130 of the frame 126.

Each carriage 168, 170 bears a pair of guide columns 172, 174 (or equivalent members) which extend in the perpendicular direction Z. This solution, which can be better understood from FIGS. 8 to 10, can be obtained by any type of prismatic sliding in the direction Z.

Each of the pairs of guide columns 172, 174 is in engagement with the respective beam 136, 138, which therefore can also translate according to Z while remaining parallel to itself. Like in the embodiment of FIG. 6, the two beams 136, 138 are staggered in the direction perpendicular to Z.

The platform 124 has displacing means associated thereto for displacing in unison in the direction Z both the platform itself and the two beams 136, 138 which, in that direction, are bound to the platform by the shoes 148, 150 and the respective slideways 144, 146, irrespective of the position of the platform 124 in the plane of movement according to X, Y.

Therefore, as different from the two-dimensional case, in this three-dimensional case it is the platform 124 that, being supported by the said displacement means, supports the beams 136 and 138 in its turn.

Preferably, as shown, the displacement means in the direction Z comprise a numerically controlled actuator, preferably an electric motor 176, whose body is fixed, as already said before, because it is fastened to the frame 126 by a post 178.

The shaft of the motor 176, through a lead screw 180 rotatably mounted on fixed supports 181, moves a nut screw 182 according to Z.

The nut screw 182 is fastened to a driving member 184 in the form of a slide which is adapted to move in the direction Z along slideways 186.

The slide or driving member 184 has, through a radial-axial bearing 188, a head 190 associated thereto, which is adapted to revolve in a plane parallel to the plane of movement according to X, Y, as well as adapted to be moved by the motor 176 in the direction Z.

The head 190 is shaped like a guide bushing having an axis parallel to the plane of movement according to X, Y.

A rod 192 is slidably mounted in the head or bushing 190.

The rod 192, at one of its ends which is contiguous to the platform 124, has a ring-like frame 194 which is parallel to the platform 124.

A hub 196, which is contained in the ring-like frame 194, is fastened to the platform 124.

An axial-radial bearing 198 is interposed between the hub 196 and the frame 194 a 198.

Thanks to the arrangement described the movements imparted by the motor or actuator 176 in the direction Z are transmitted to the platform 124 and, through the latter, to the two beams 136, 138, irrespective of the position taken by the platform 124 within the frame 126. This is obtained thanks to the fact that the rod 192 can slide in the head or bushing 190 as well as to the fact that the head 190 and the rod 192 can revolve around an axis which is parallel to the direction Z.

Reference to FIGS. 11 and 12 will now be made to describe a second embodiment of the manipulator device in which the platform travels according to two Cartesian axes.

In FIGS. 11 and 12 the parts equivalent to those of FIGS. 6 and 7 are indicated by the same reference numerals increased by 200.

In FIG. 12 the tool, which may be once again a laser source, has been indicated 218 and the same reference numeral 218 indicates its trace in FIG. 11.

The tool 218 is carried by a support platform constituted by a block 224 having a square shape in plan view.

The platform 224 is supported by a frame generally indicated 226.

In the embodiment of FIGS. 11 and 12, the frame 226 is constituted by a rigid member in the form of a square or rectangular frame with branches 228a, 228b and 230a, 230b, respectively, facing each other by pairs.

The branches 228a, 228b extend according to a direction X and the branches 230a, 230b extend according to an orthogonal direction Y, the two directions X, Y still defining a working plane.

Each branch 228a, 228b and 230a, 230b is equipped with a slideway 232a, 232b and 234a, 234b, respectively.

The slideways 232a, 232b, on the one hand, and the slideways 234a, 234b, on the other hand, are parallel to each other.

For the same reasons explained in connection with the embodiment of FIGS. 6 and 7, the slideways 232a, 232b, on the one hand, and the slideways 234a, 234b, on the other hand, are staggered in the direction Z perpendicular to the sliding plane.

Each slideway 232a, 232b and 234a, 234b has a structure 36 and 238, respectively, associated thereto, which is adapted to travel in the manner of a slide.

The sliding structures 236, 238 are constituted by orthogonal beams extending, in the manner of bridges, between two opposite branches 228a, 228b and 230a, 230b, respectively, of the frame 226 and are guided along both of these branches.

The two beams 236, 238 have rectangular lightening windows, 237 and 239, respectively, to reduce their weight and therefore their inertial mass.

The two sliding structures or beams 236, 238 are staggered like the slideways 232a, 232b and 234a, 234b in order not to interfere with each other in their movements.

Each of the sliding structures or beams 236, 238 is equipped with sliding shoes 240a, 240b and 242a, 242b, respectively, which are coupled with the respective slideways 232a, 232b and 234a, 234b.

Further, each of the sliding structures or beams 236, 238 is equipped with a slideway 244, 246, respectively.

In its turn, the platform 224 is provided, on two sides orthogonal to each other, with sliding shoes 248, 250 which are coupled with the respective slideways 244, 246.

The configuration of all the slideways 232, 234, 244, 246, on the one hand, and of all the shoes 240, 242, 244, 246, on the other hand, is such as to provide a form fit, more particularly a dovetail fit, between the slideways and the shoes, so that the platform 224 is both supported and guided by the frame 226.

The movements in the direction X of the beam 236 and, consequently, of the platform 224 are produced by a pair of numerically controlled actuators working in parallel which, in the example shown, are still constituted by two electric motors 252a, 252b.

The two motors 252a, 252b drive in unison each a respective lead screw 254a, 254b which is rotatably mounted on two fixed supports 255a, 255b. The lead screws 254a, 254b drive in the direction X respective nut screws 256a, 256b which are fixed in brackets constituted by respective side appendages 258a, 258b of the sliding structure or beam 236.

The movements in the direction Y of the other sliding structure or beam 238 and, consequently, of the platform 224, are produced as well by a pair of numerically controlled actuators which, in the embodiment shown, are still electric motors 260a, 260b, identical to the motors 252a, 252b.

The motors 260a, 260b drive in unison each a respective lead screw 262a, 262b which is rotatably mounted on two fixed supports 263a, 263b. The lead screws 262a, 262b drive in the direction Y respective nut screws 264a, 264b which are fixed in brackets constituted by respective side appendages 266a, 266b of the sliding structure or beam 238.

The manipulator device shown in FIGS. 11 and 12 has, with respect to the one shown in FIGS. 6 and 7, the advantage that much more accurate movements can be imparted to the tool 218 for the fact that each of the two beams 236, 238 is guided by parallel slideways at both ends and, in addition, is driven, at each end, by driving means operating synchronously in parallel.

These features ensure that each of the two beams 236, 238 will always be parallel to itself in its movements without incurring even the slightest misalignment or angular offset.

Reference to FIGS. 13 and 14 will now be made to describe a third embodiment of the manipulator device in which the platform still travels according to two Cartesian axes.

In FIGS. 13 and 14 the parts equivalent to those of FIGS. 6 and 7 are indicated by the same reference numerals increased by 300.

In FIG. 14 the tool, which may be once again a laser source, has been indicated 318 and the same reference numeral 318 indicates its trace in FIG. 13.

The tool 318 is still carried by a support platform constituted by a block 324 having a square shape in plan view.

The platform 324 is supported by a frame generally indicated 326.

In the embodiment of FIGS. 13 and 14 the frame 326 is constituted by a rigid member which includes two rectangular tables 328, 330 which are rigidly interconnected by a gusset or brace 329.

The major axes of the tables 328, 330 extend according to two orthogonal directions X, Y, respectively, in a working plane which is parallel to these directions.

Each table 328, 330 is equipped, on its underside, with respective pairs of parallel slideways 332, 334.

For the same reasons explained above, the pairs of slideways 332, 334 are staggered in the direction Z perpendicular to the sliding plane.

Each pair of slideways 332, 334 has a respective structure 336, 338 associated thereto, which is adapted to travel in the manner of a slide.

The two sliding structures 336, 338 comprise respective plates which are staggered like the slideways 332, 334 in order not to interfere with each other in their movements.

Each of the two sliding plates 336 and 338 extends under a respective table 328, 330 and is parallel to the latter.

Each sliding plate 336, 338 is equipped, on its upper face, with sliding shoes 340, 342, respectively, which are coupled with the respective pairs of slideways 332, 334.

In its turn, each of the sliding plates 336, 338 is equipped with a slideway 344, 346, respectively, on a side thereof which faces the table 330, 328.

In its turn, the platform 324 is provided, on two sides orthogonal to each other, with sliding shoes 348, 350 which are coupled with the respective slideways 344, 346.

The configuration of all the slideways 332, 334, 344, 346, on the one hand, and of all the shoes 340, 342, 344, 346, on the other hand, is such as to provide a form fit, more particularly a dovetail fit, between the slideways and the shoes so that the platform 324 is supported, in addition to be guided, by the frame 326.

The movements in the direction X of the sliding plate 336 and, consequently, of the platform 324 are imparted by a first drive unit, generally indicated 351, which is entirely mounted on the top face of the table 328.

The drive unit 351 includes a numerically controlled actuator which, in the example shown, is still constituted by an electric motor 352.

The motor 352 drives a lead screw 354 which is rotatably mounted on two fixed supports 355, carried by the top of the table 328. The lead screw 354 drives in the direction X a nut screw 356 which has a bracket 358 fixed thereto, the bracket being 358 fixed in its turn to the sliding plate 336 which underlies the table 328.

The movements in the direction Y of the other sliding structure or sliding plate 338 and, consequently, of the platform 324 are imparted by a second drive unit, generally indicated 359, which is entirely mounted on the top face of the table 330.

The drive unit includes a numerically controlled actuator which, in the case shown, is still an electric motor 360, identical to the motor 352.

The motor 360 drives a lead screw 362 which is rotatably mounted on two fixed supports 363, carried by the top of the table 330. The lead screw 362 drives in the direction Y a nut screw 364 which has a bracket 366 fixed thereto, the bracket being fixed in its turn to the sliding plate 338.

A manipulator as shown in FIGS. 13 ad 14 is likely to be even more accurate, as regards the movements of the tool 318, because the sliding structures 336, 338 are not beams subject to flexure, such as the cantilever beams 36, 38 of FIGS. 6 and 7 and the beams or girders 236, 238 supported at both ends of FIGS. 11 and 12.

If the tables 328, 330 and the sliding plates 336, 338 are properly dimensioned, flexure of the plates 336, 338 is practically impossible because the latter are widely supported by the slideways 332, 334, 344, 346 affixed to the underside of the tables 328, 330, and by the corresponding shoes 340, 342, 344, 346.

Due to the arrangement of the whole driving units 351, 359 on the top of the tables 328, 330, the manipulator of FIGS. 13 and 14 has the further advantage that the space under the manipulator, in which the tool 318 moves, is completely free from obstacles an can be fully exploited for the machining or cutting operations etc.

The invention claimed is:

1. A manipulator device for moving a tool in a plane of movement along at least two Cartesian axes X and Y, which device is adapted to be used independently or to be installed on a traveling structure of a machine tool, said device including a platform provided with a support for the tool and adapted to travel according to the said axes, a frame, actuators for controlling the movements of the platform, and a support for the platform;

the frame being equipped with at least a first and a second main slideway respectively directed according to said axes X and Y, and said device including a first sliding structure and a second sliding structure which are substantially symmetrical to each other and are adapted to travel in the manner of a slide along said first main slideway and along said second main slideway, respectively;

each sliding structure being equipped in its turn with a respective auxiliary slideway orthogonal to its traveling direction and the platform being slideably coupled with and supported by the auxiliary slideways of each sliding structure; and each of said actuators including a body fastened to the frame and a driving member mechanically connected to the respective sliding structure;

wherein the platform is located in a position between said first sliding structure and said second sliding structure, and it is supported by said auxiliary slideways of the said first and second sliding structures, respectively, on two sides thereof which are orthogonal to each other in order that each sliding structure extends only on a respective side of the platform.

2. A device according to claim 1, wherein said frame comprises a rigid member including two tables interconnected to each other and extending according to said orthogonal directions X and Y in the said plane of movement, each table being provided, on its underside, with respective pairs of main slideways which are staggered in a direction Z perpendicular to said plane of movement;

the two sliding structures comprise respective plates staggered in the said perpendicular direction Z;

each of the sliding plates extends under a respective table and is parallel to the latter;

each of the sliding plates is provided, on its upper face, with main sliding shoes, each of which is coupled with a respective main slideway;

each of the sliding plates is provided with an auxiliary slideway on a side thereof which faces the table of the frame to which the other sliding plate is associated; and the platform is provided, on two sides orthogonal to each other, with auxiliary sliding shoes which are coupled with the respective auxiliary slideways.

* * * * *